United States Patent [19]

Najafi

[11] Patent Number: 5,442,457

[45] Date of Patent: Aug. 15, 1995

[54] MULTI-LINE POOLING FACSIMILE APPARATUS

[76] Inventor: Hamid Najafi, 1256 Russell Ave., Los Altos, Calif. 94024

[21] Appl. No.: 2,607

[22] Filed: Jan. 11, 1993

[51] Int. Cl.⁶ ............................................. H04N 1/00
[52] U.S. Cl. ................... 358/400; 358/435; 379/100; 375/260
[58] Field of Search ............ 358/400, 405, 435, 442; 379/97, 98, 100; 375/38

[56] References Cited

U.S. PATENT DOCUMENTS

| | | | |
|---|---|---|---|
| 4,775,987 | 10/1988 | Miller | 375/38 |
| 4,818,995 | 4/1989 | Takahashi et al. | 375/38 |
| 4,862,456 | 8/1989 | Giorgio | 375/38 |
| 4,864,567 | 9/1989 | Giorgio | 375/38 |
| 4,890,316 | 2/1989 | Walsh et al. | 379/98 |
| 5,031,206 | 7/1991 | Riskin | 379/97 |
| 5,058,133 | 10/1991 | Duncanson et al. | 375/38 |
| 5,200,993 | 4/1993 | Wheeler et al. | 379/100 |
| 5,231,649 | 7/1993 | Duncanson | 375/38 |
| 5,274,836 | 12/1993 | Lux | 375/38 |
| 5,293,378 | 3/1994 | Shimizu | 375/38 |

OTHER PUBLICATIONS

CCITT Document Entitled 600/1200-Baud Modem Standardized for Use in the General Switched Telephone Network (Geneva, 1964; amended at Mar del Plata, 1968, Geneva, 1972, 1976 and 1980, and at Malaga-Torremolinos, 1984).

*Primary Examiner*—Scott A. Rogers
*Assistant Examiner*—Thomas L. Stoll
*Attorney, Agent, or Firm*—Haverstock, Medlen & Carroll

[57] ABSTRACT

A multi-line facsimile communication system, where two or more telephone lines are used simultaneously to transmit messages in order to increase the aggregate channel capacity and thereby increase transmission speed and reduce the transmission time. The system further incorporates back channel technology to transmit certain status information from the receiving facsimile machine to the transmitting facsimile machine.

1 Claim, 4 Drawing Sheets

BLOCK DIAGRAM OF MLPF

FIG. 2 BLOCK DIAGRAM OF MLPF

MULTI-LINE POOLING FACSIMILE APPARATUS

FIELD OF THE INVENTION

The present invention relates to a facsimile communication system between facsimile machines, and more specifically to a multiple line facsimile communication system and one which sends facsimile data and receives status data simultaneously.

BACKGROUND OF THE INVENTION

Facsimile transmission of information is becoming an essential form of communication in business and government because of its time saving advantages.

A facsimile communication system operates in the following manner. After the transmitter and receiver connection has been initialized, a facsimile machine scans a page, scanning about 200 line pixels/inch, thus converting pixels to a series of ones and zeros. After a page is scanned, the pixel information is transmitted through telephone lines to a remote receiving facsimile machine. After a page of pixel information is received at the remote facsimile machine, several seconds are spent as the receiving machine sends to the transmitting machine a positive confirmation that the transmission has been received. If something happens in the middle of a page transmission, the transmitting facsimile machine will not be able to detect that there is a problem until after the entire page is transmitted. Furthermore, if the transmitting machine does not receive the positive confirmation, then the transmitting machine disconnects itself from the telephone line, and thus ends the transmission of the information. To effect transmission, a user must then resend the transmission, thus re-initializing the transmitter and receiver connection and start the transmission from the beginning.

The speed of a transmission is dependent upon the mode of telephone transmission. In some parts of the world, rapid information transmission is possible through telephone lines which operate in a digital mode. However, in most parts of the world, telephone lines operate in an analog mode, and therefore, their data transfer rate (bit rate) is typically limited to 9600 bits per second (bsp). The speed of a facsimile communication system is thus limited by the information capacity of the telephone lines which interfaces the facsimile machines. By utilizing high speed signal processing and efficient digital modulation techniques, the digital data transmission over analog phone lines is reaching its throughput limits.

One method commonly used which has the appearance of speeding up a facsimile transmission is the compression of the pixel data at the transmitter and the subsequent expansion of that data at the receiving end. The compression/expansion unit (CEU) of a facsimile machine operates to reduce the amount of information to be transmitted and received, however, it does not transmit information faster.

SUMMARY OF THE INVENTION

In light of the aforementioned problems with the prior art, it is therefore an object of the present invention to increase the reliability of a facsimile transmission by avoiding disconnection which results in having to resend a facsimile transmission.

It is another object of the invention to increase the speed of a facsimile transmission.

In accordance with these and other objects, the present invention is a multi-line facsimile communication system, where two or more telephone lines are used simultaneously to transmit messages in order to increase the aggregate channel capacity and thereby increase transmission speed and reduce the transmission time. The system incorporates a back channel which is used to transmit certain status information from the receiving facsimile machine to the transmitting facsimile machine to issue, for example, a "repeat transmission" request, to report malfunction or unavailability of the receiver (e.g. paper out) as well as other pertinent information simultaneously with the transmitting machine's transmission. The back channel further reduces transmission time by eliminating status checks at the end of each page, and by reporting a malfunction anytime in the course of a page transmission rather than waiting to the end of each page before the reporting is done.

DETAILED DESCRIPTION OF THE INVENTION

Telephone lines, referred to as Public Switched Telephone Network (PSTN) lines, have a limited bandwidth of about 3 KHz which occupy the frequency range of 300 Hz to about 3.3 KHz. Certain digital lines are available in certain areas which have a higher channel bandwidth and can be used for higher speed facsimile transmission, but they are not available everywhere and their cost is much higher than an analog PSTN line.

In the present invention, to increase the reliability of a transmission, to save time in sending a transmission and to minimize re-sends, a receiving channel is established to send status information from the receiving machine to the transmitting machine while a transmission is being sent. For example, the receiving channel may occupy the frequencies between 300 Hz and 330 Hz and therefore, occupy only 1% of the available 3.0 KHz bandwidth. By using the remaining frequencies of 330 Hz to 3.3 Hz, the speed of the transmission is not perceptibly affected in order to accommodate the receiving channel.

Figure 1:
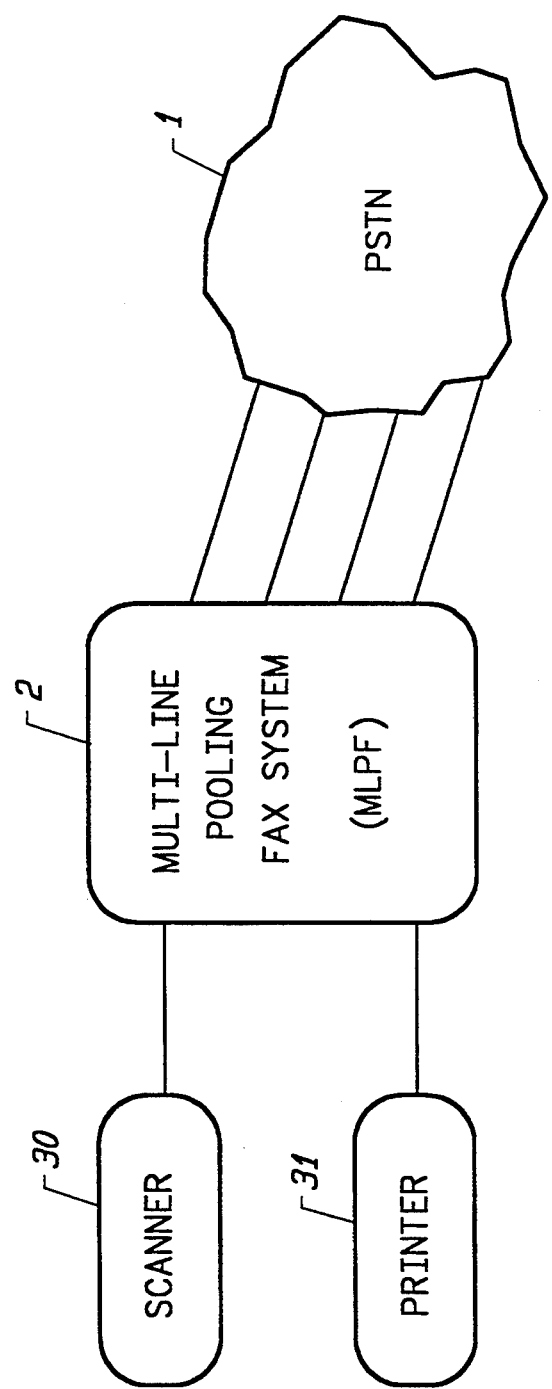
FIG. 1 is a connection diagram of the present invention.
Figure 2:
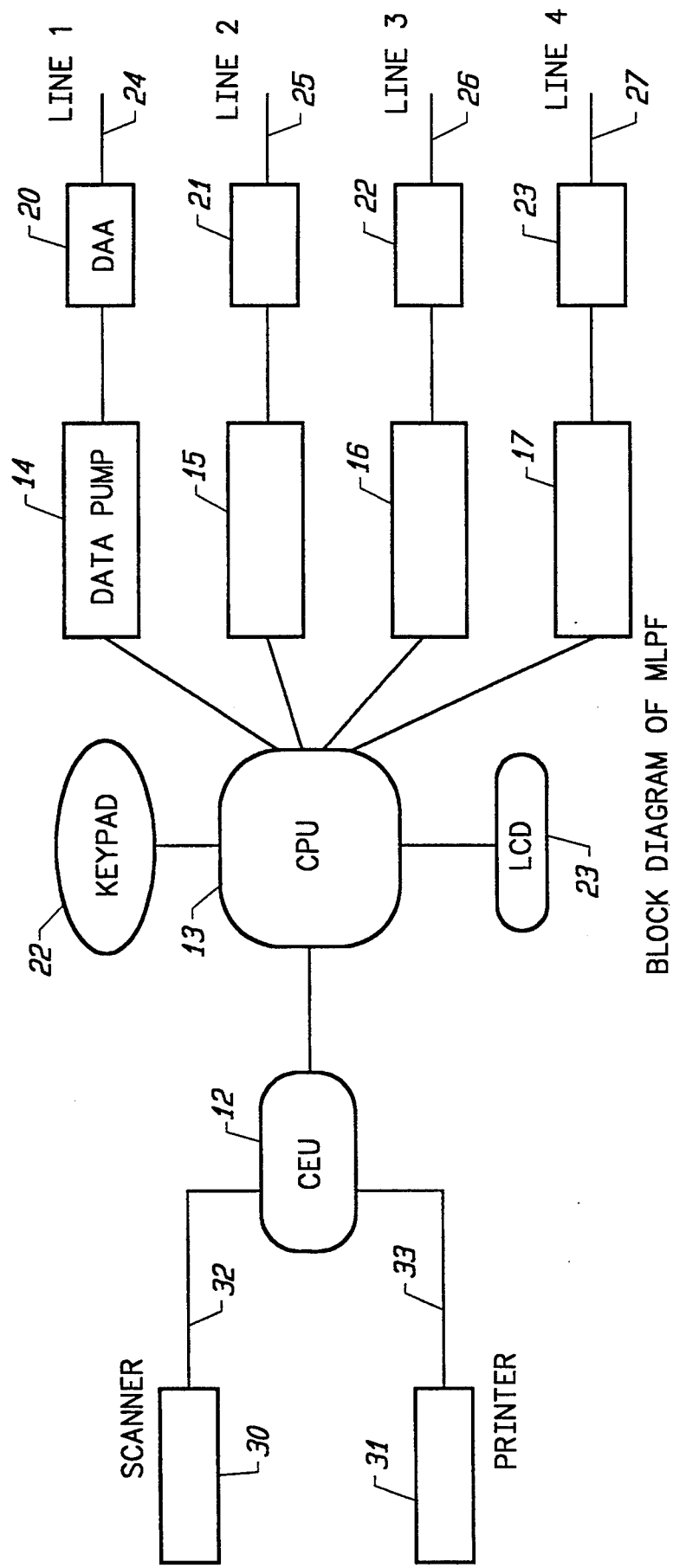
FIG. 2 is a block diagram which illustrates the overall configuration of the present invention.

FIG. 1 shows a connection diagram showing how a Multi-Line Pooling Fax (MLPF) is connected to a scanner for facsimile input, to a printer for printing received facsimile messages, and the PSTN through four telephone lines. The circuit provides for the configuration of the receiving channel as well as the transmitting channel. Each channel occupies a sub-bandwidth of the bandwidth occupied by data sent through the telephone line. The present invention utilizes the back channel technique for configuring a receiving channel to receive data from a receiving facsimile machine while simultaneously transmitting data on each line. Furthermore, the present invention multiplies the communication system's capacity by using a multiplicity of lines in parallel, and therefore providing for transmission though two or more lines simultaneously. FIG. 2 shows an embodiment of the present invention which uses four telephone lines 24, 25, 26 and 27 to connect to the PSTN 1. It has a standard scanner interface 32 as well as a printer port 33. In an integrated embodiment, the scanner and/or the printer may be integrated with the MLPF 2.

Figure 3:
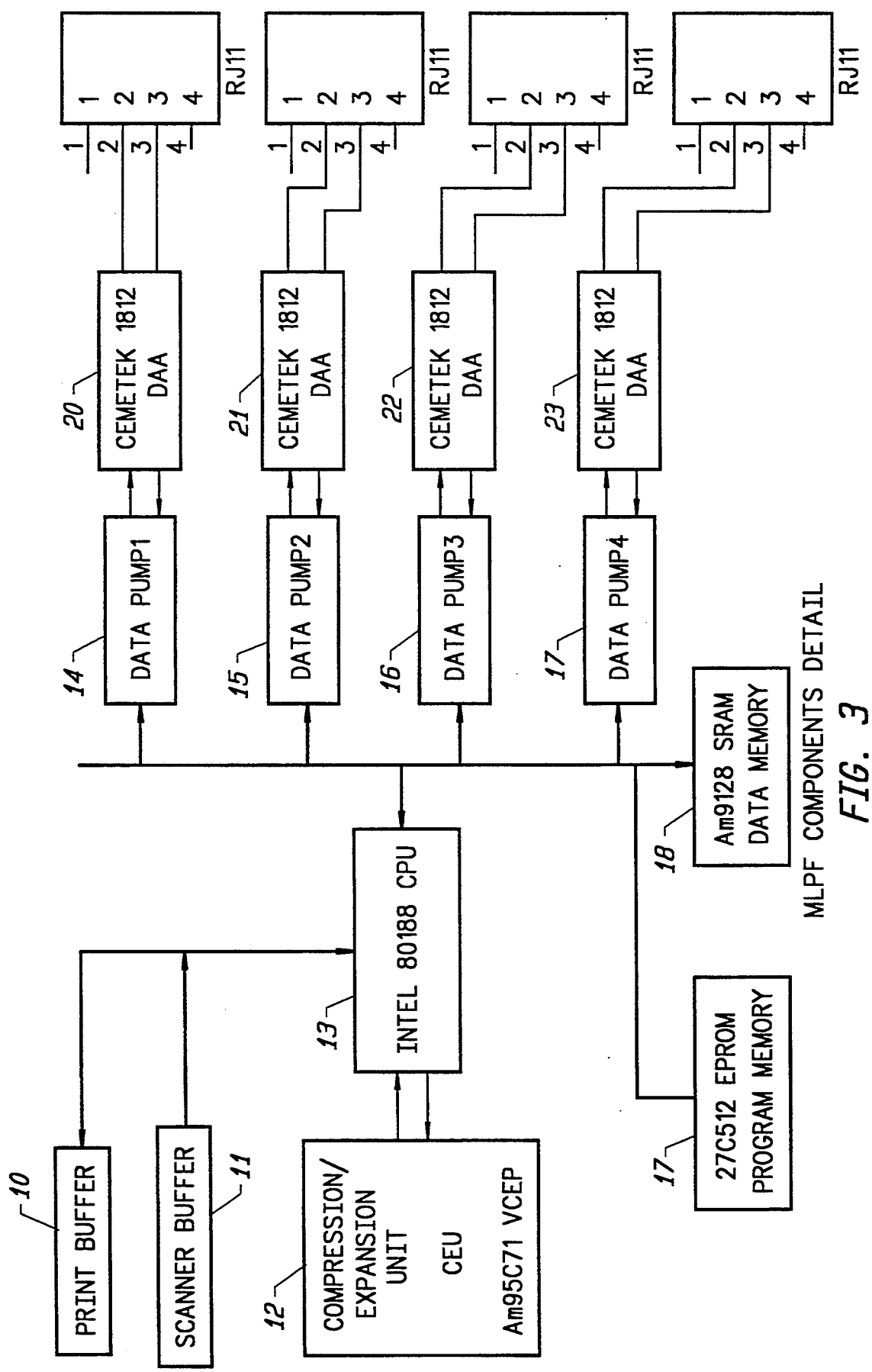
FIG. 3 is a block diagram detailing the components of the multi-line pooling facsimile system (MLPF) identified in FIG. 2.

FIG. 3 shows components details of the MLPF 2 shown in FIG. 2. The scanner 30 converts a page of document into a series of pixel bits. The Compression-/Expansion Unit (CEU) 12 compresses these bits into a smaller number of bits representing the document image. The Central Processing Unit (CPU) 13, which is for controlling the data flow, calling procedures, keypad and LCD interface, scanner and printer interface, and other control function, uses one of the phone lines 24, 25, 26, and 27 and dials the phone number requested by the user as an initialization procedure. When the receiving facsimile machine at the other end answers, it informs the sending MLPF 2 whether it is regular facsimile machine or another MLPF. If it is a regular facsimile machine, the CPU 13 proceeds like a standard facsimile machine.

If the receiving machine is also a MLPF, it informs the sending MLPF of the number of phone lines it supports and their corresponding telephone numbers. The sending MLPF then establishes the call through the rest of the available phone lines. The CPU 13 divides the data into shares or portions for each phone line, thus splitting or dividing up the data, packetizes the data and sends the data using the data pumps 14, 15, 16 and 17. The CPU at the receiving MLPF receives data, reassembles them, sends them through the CEU for expansion, and if requested, directs the information to the printer.

Figure 4:
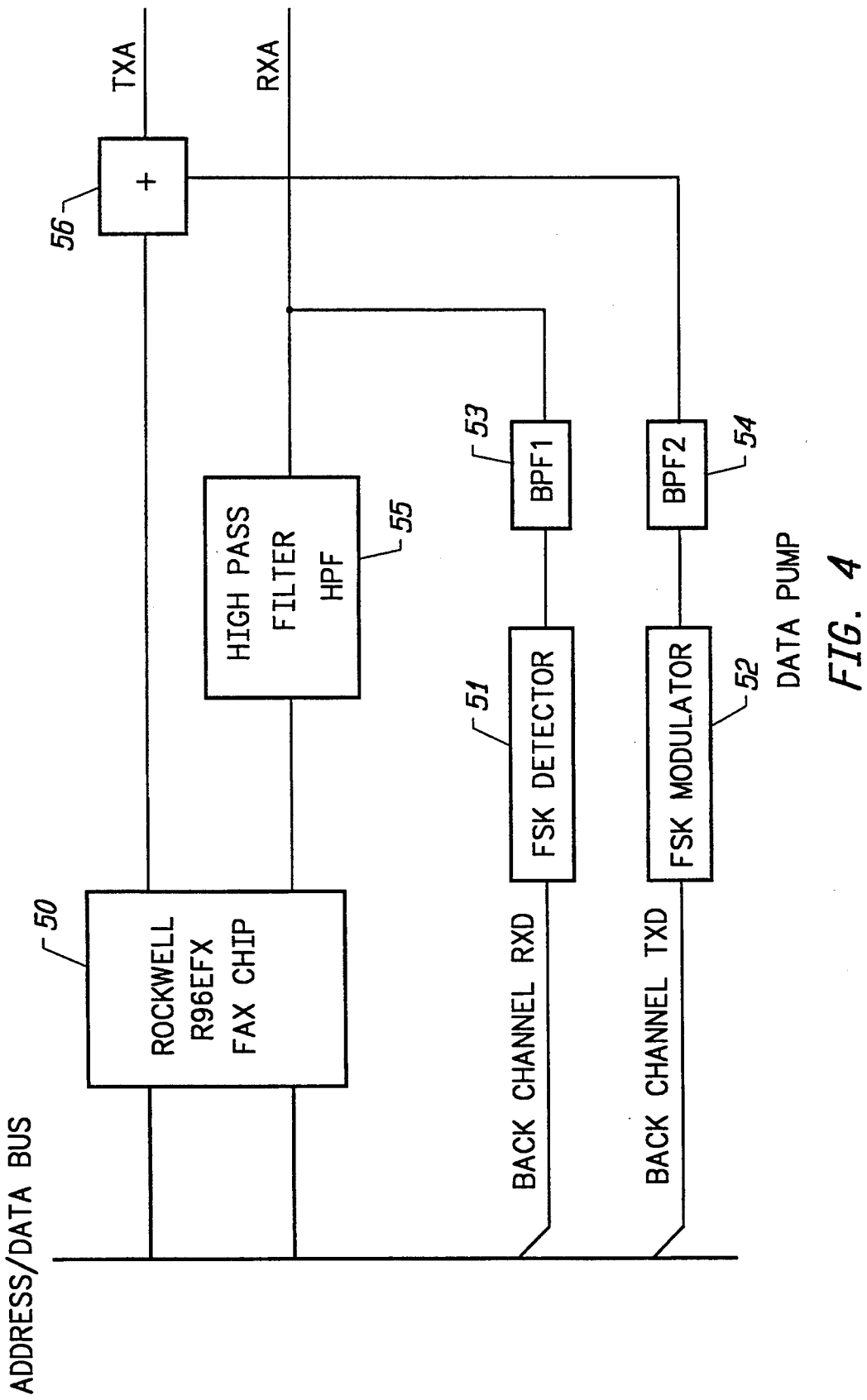
FIG. 4 is a block diagram detailing the components of the Data Pump in with reference to FIG. 3.

FIG. 4 shows a diagram of the data pump referred to in FIG. 3, such splitting the channel into a main channel and a narrow back channel. The low bit rate back channel is implemented by using the Band Pass Filters 53 and 54 and FSK detector 51 and FSK modulator 52. The High pass filter 55 removes the back channel signal from the received signal RXA before this signal is fed to the Facsimile chip 50. Signals from the FSK modulator 52 provide the back channel transmit signal which is filtered by a narrow band pass filter 54 and added to the transmit signal generated by the Facsimile chip 50 by the adder 56.

Further advantages of the present invention include that an alternate calling procedures may be activated to save time. For example, when a transmission of a facsimile message begins on a first line, calls can be established on the other lines and the newly established connections can be used as they become available.

Also, in many cases, the calls on all lines can be established by calling the same number repeatedly if the lines belong to the same "hunt group" established by the telephone company. A Hunt group is a combination of multiple phone numbers assigned, normally, to a business location which can be reached by dialing a single phone number. If one line is busy, the call can is directed to the next line in the Hunt group by the local phone company.

Furthermore, the present invention can also be used to send the same facsimile messages to different destinations, simultaneously. For example, while some lines are communicating with another MLPF, one line can be used to communicate with a second machine while another line is used to communicate with a third machine.

While the invention has been herein shown and described in what is presently conceived to be the most practical and preferred embodiment of the present invention, it will be apparent to those of ordinary skill in the art that many modifications thereof may be made within the scope of the invention, which scope is to be accorded the broadest interpretation of the claims so as to encompass all equivalent structures and devices.

What is claimed is:

1. In a facsimile machine for sending data to a similar facsimile machine, an improvement comprising:

first means for interfacing said facsimile machine with a first telephone line;

second means for interfacing said facsimile machine with a second telephone line;

means for splitting data to be sent from said facsimile machine to said similar facsimile machine into a first data portion and a second data portion;

means routing said first data portion to said first interface means so that said first data portion can be sent along said first telephone line and means routing said second data portion to said second interface means so that said second data portion can be sent along said second telephone line;

wherein said first and second interface means further comprises;

first means for transmitting data from said first mentioned facsimile machine to said similar facsimile machine within a first fixed subbandwidth of said first telephone line with a given bandwidth defining a transmission channel which occupies a first fixed percentage of said given bandwidth; and second means for simultaneously receiving data by said first mentioned facsimile machine from said similar facsimile machine and within a second fixed subbandwidth of said first telephone line defining a receiving channel which occupies a second fixed percentage of said given bandwidth.

* * * * *